United States Patent Office 3,676,152
Patented July 11, 1972

3,676,152
UNLEAVENED, FINE GRAIN HIGH VOLUME
LAYER CAKE MIX
James B. Edwards and Warren R. Haug, Hamilton County, Ohio, assignors to The Procter & Gamble Company, Cincinnati, Ohio
No Drawing. Filed Dec. 29, 1969, Ser. No. 888,863
Int. Cl. A21d 2/00; A23l 1/10
U.S. Cl. 99—94                                                      5 Claims

ABSTRACT OF THE DISCLOSURE

An unleavened fine grained, high volume layer cake mix in which the shortening contains a high percent of alpha-phase crystal-tending emulsifiers and is free from leavening ingredients which release $CO_2$ gas before or during the baking process.

BACKGROUND OF THE INVENTION

This invention relates to new and improved layer cake mixes, layer cake batter systems, and baked layer cakes. The shortening used in these mixes, batters, and baked cakes contains a high level of α-crystalline lipids. There are no $CO_2$-producing leavening agents present in the cake mixes, batters or baked products.

So-called "dry" prepared mixes used for baking layer cakes are generally made by combining sugar, flour, shortening and other ingredients including leavening, milk solids, egg solids, flavoring, and coloring, to form a free-flowing granular mixture. To prepare these dry mixes for baking, liquid materials such as water, milk, and eggs are added, and the combination is beaten to form a homogeneous mixture and to incorporate air. The resulting batter is then baked.

It has been generally recognized in the prior art and practice that there must be leavening ingredients which produce $CO_2$ gas in these mixes in order to produce a cake of acceptable volume. In general, such leavening ingredients were composed of a baking soda, e.g., sodium, potassium, or ammonium bicarbonate, on the one hand, and one or more phosphate or other common baking acids on the other. Suitable baking acids included monocalcium phosphate, dicalcium phosphate, sodium acid pyrophosphate, potassium acid tartrate, monosodium phosphate, sodium aluminum phosphate, and sodium aluminum sulfate, among others. The amount of soda and the selected acid were so balanced as to achieve a pH in the resultant batter of about 6–10. Frequently, provision of a slight excess of soda was advantageous so as to assure absence of unreacted phosphate acid and/or to compensate for the acid tendencies of some batter ingredients. These leavening ingredients provided no other benefit than the release of $CO_2$ gas during the mixing and/or baking of the batter thought necessary to obtain a cake of acceptable volume and texture; in fact, they and their reaction products all have an undesirable taste which must be covered.

The primary objective of this invention is to remove the usual leavening agents which produce $CO_2$ that are employed in the making of layer cakes and to thus eliminate the undesirable effects normally associated with such ingredients. These undesirable effects include the following: They impart a bad taste to the finished product which must be covered by increased amounts of sugar or flavoring ingredients. The baking soda gradually deteriorates while the cake mix sits upon the shelf, and eventually becomes inactive. The $CO_2$ produced by the leavening reaction is actually the primary cause of coalescence during baking, which in turn produces a coarsely grained and highly tunneled cake. Finally, in a one-step mixing process the pH level of the batter must be held within narrow limits to permit leavening agents to work. This prevents the addition of several desirable flavoring ingredients that change the pH to an unacceptable level.

A further object of this invention is to increase the shelf life of the baked cake by producing a finely grained and less tunneled cake.

SUMMARY OF THE INVENTION

This invention produces a cake of superior flavor, grain, and density without the use of the leavening ingredients heretofore thought necessary. This is accomplished by omitting the leavening agents which produce $CO_2$ from the cake mix and batter while incorporating into the shortening used in the preparation of the mix and batter a high level of α-phase crystal-tending emulsifiers A layer cake made simply from a mix without $CO_2$ producing leavening ingredients is totally unacceptable. It is very finely grained, but much too dense to be palatable. Even a cake made from a mix without $CO_2$ producing leavening ingredients but with a shortening which is emulsified at the present conventional levels of from 8% to 15% is also too dense to be palatable. However, it has now been discovered that by increasing the level of a certain kind of emulsifier in the mix above a certain minimum amount, an acceptable cake is produced without the $CO_2$ leavening ingredients. Moreover, by employing the non-leavened mix emulsified in the manner of this invention, a cake of superior quality is produced.

Illustrative examples of dry cake mix formulae embodying the concept of the invention are the following, all proportions by weight.

Yellow type cake

| Ingredients: | Percent |
|---|---|
| Sugar | 35–60 |
| Flour | 30–50 |
| Shortening | 8–15 |
| Non-fat dried milk solids | 0.5–5.0 |
| Salt | 0.5–2.0 |
| Egg solids | 0–5.0 |
| Flavoring | 0.1–5.0 |
| Coloring, minor amount, if any. | |

Chocolate type cake

| Ingredients: | Percent |
|---|---|
| Sugar | 35–60 |
| Flour | 25–50 |
| Shortening | 8–15 |
| Non-fat dried milk solids | 0.5–3.0 |
| Cocoa | 4.0–8.0 |
| Salt | 0.5–2.0 |
| Flavoring | 0.1–1.0 |
| Coloring, minor amount, if any. | |

White type cake

| Ingredients: | Percent |
|---|---|
| Sugar | 35–60 |
| Flour | 35–50 |
| Shortening | 8–15 |
| Non-fat dried milk solids | 0.5–5.0 |
| Salt | 0.5–2.0 |
| Flavoring | 0–5.0 |

Suitable sugars include any of the commonly used granular sugars such as sucrose, dextrose, maltose, fructose, lactose, and brown and invert sugars. The sugar can also be in powdered form, and mixtures of more than one type of sugar can be held.

The flour used in the practice of this invention should be the usual bleached cake flour. Although a good general purpose flour can be used, the preferred flour is a bleached soft white wheat flour.

The shortenings which can be employed in the cake mix compositions of this invention include solid or plastic as well as liquid or semi-fluid glyceride shortenings derived from animal, vegetable or marine fats and oils, including synthetically prepared shortenings. These glycerides can contain saturated or unsaturated "long-chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucoyl, and the like, and are generally obtained from edible fats and oils such as cottonseed oil, soybean oil, coconut oil, rapeseed oil, peanut oil, olive oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl; they can be prepared by random or low-temperature interesterification reactions of fatty triglyceride-containing oils and fats, such as interesterified or rearranged cottonseed oil and lard; and they can be otherwise formed by various organic syntheses. Lard is a preferred shortening for use herein.

The above shortenings which can be employed in the culinary mix systems of this invention must be of the so-called emulsified variety, containing up to 50%, and over 15% by weight of shortening of one or more suitable α-phase crystal-tending emulsifiers, e.g., those disclosed in U.S. Pats. 3,145,108 and 3,145,109 issued to Howard on Aug. 18, 1964 and in U.S. Pat. 3,145,110 issued to Abbott on Aug. 18, 1964. Examples of such α-phase crystal-tending emulsifiers include, but are not limited to the following: propylene glycol monostearate, propylene glycol monopalmitate, propylene glycol monopalm oil, propylene glycol mono esters of Crambe oil, acetylated mono- or di-glycerides, and lactylated mono- or diglycerides.

In a preferred embodiment of this invention the shortening contains from 23% to 35% of one or more α-phase crystal-tending emulsifiers while in a more preferred embodiment, the shortening is a plastic shortening. As used herein, the term "plastic" shortening defines a solid non-fluid and non-pourable shortening at room temperature (70° F.–75° F.).

In the most preferred embodiment of the invention the shortening composition consists of 70% to 76% lard, 10% to 14% propylene glycol monopalmitate, 9% to 13% propylene glycol mono esters of palm oil, and 2% to 5% propylene glycol mono esters of Crambe oil.

The exact method of compounding the dry mixes of this invention is not critical. Very satisfactory results are obtained by blending the flour, sugar, and shortening into a homogeneous premix in a ribbon blender. This premix can be passed through an impact grinder to eliminate any lumps which may be formed. Additional ingredients can then be added and the whole mixture of ingredients again mixed. An additional step of impact grinding can be performed to remove any lumps present in the final dry mix.

Another method of preparing the dry mix is by the methods disclosed in U.S. Pat. 2,874,051 issued to Bedenk et al., 2,874,052 issued to Bedenk, and in 2,874,053 issued to Mills on Feb. 17, 1959 in which a homogeneous blend is formed containing sugar, flour and shortening, and this blend is then subjected to simultaneous shearing and crushing forces.

All types of flour based prepared layer cake mixes and layer cake batters can be made with the products of this invention. White cakes, yellow cakes, chocolate cakes, devils food cakes, marble cakes, spice cakes, high ratio as well as low ratio cakes, and many other layer cakes of excellent quality can be prepared simply by mixing the layer cake ingredients together with water in a single mixing step, or multiple mixing steps, followed by baking.

The following examples further illustrate the invention. All percentages are by weight unless otherwise specified.

EXAMPLE I

A cake mix for producing white cake was prepared utilizing the following formula:

| Ingredient: | Weight percent |
| --- | --- |
| Sugar (powdered sucrose) | 38.90 |
| Flour (soft white wheat flour) | 41.56 |
| Shortening * | 11.20 |
| Dextrose | 4.09 |
| Non-fat dry milk solids | 3.08 |
| Salt | 0.76 |
| Bean gum | 0.31 |
| Vanilla | 0.10 |

*The shortening was essentially 13% propylene glycol monopalmitate, 11% propylene glycol mono esters of palm oil, 3% propylene glycol mono esters of Crambe oil, and 73% lard.

The cake mix was prepared by thoroughly mixing the sugar, flour and shortening and then milling by passing through a 3-roll mill, the first and second rolls having speed ratios of 3:1, and the second and third rolls having ratios of 2:1. Two passes through the mill were made. After milling, the other ingredients were added and thoroughly blended in and the mixture finally passed through an impact grinder.

Cakes of superior volume, fine grain structure, and tender eating qaulity were made from this mix by adding the white of two eggs and about one and a quarter cups of water to 20 oz. of the mix, beating slowly with a standard home mixer until ingredients were moist, at a medium speed for two minutes, then at the highest speed for not less than three minutes, and baking for about 30 minutes at 360° F.

A cake produced as described above was compared with two control cakes using essentially the same ingredients in the same amounts with the exception being the shortening and leavening ingredients. The shortening used in the control cakes, at the same amount, consisted essentially of 87% Pertex, a commercial shortening product made from hydrogenated vegetable oils, 10% lactic acid emulsifier and 3% rapeseed monoglyceride. In control cake 1 the mix of the example was chanked to contain the following amount of chemical leavening ingredients, by weight percent: 0.85% baking soda, 0.75% sodium acid pyrophosphate, and 0.46% monocalcium phosphate, while in control cake 2 no chemical leavening ingredients were added at all. The control cakes were prepared and baked in the usual way, by mixing the dry ingredients with water and egg whites. In order to make a fair comparison, control cake 1 was mixed for three minutes according to the directions that accompany the mix; while control cake 2 was mixed eleven minutes, until the batter would no longer incorporate air and the maximum batter volume was obtained. All mixing was done with a standard household mixer. Exactly the same amount of batter, by weight, and the same size pan was used for each test layer. Table I compares a layer of each control cake with one of this example.

As can be seen in Table I, the cakes were measured in several ways. The physical measurements of the layers showed that both control cake 1 and the cake of this example were within a few hundredths of an inch of having the same height both hot and cold, the cake of

TABLE I

| Cake layer | $CO_2$ producing leavening present | Batter density (gm./cc.) | Cake height center (inches) | | Cake height edge (inches) | | Weight of depanned cake (grams) | Grain grade | Hole and tunnel rating | Total mixing time (minutes) |
|---|---|---|---|---|---|---|---|---|---|---|
| | | | Hot | Cold | Hot | Cold | | | | |
| Control cake 1 | Yes | 0.78 | 1.98 | 1.89 | 1.33 | 1.23 | 410 | 8 | 9 | 3 |
| Control cake 2 | No | 0.785 | 1.30 | 1.04 | 1.09 | 0.86 | 376 | 9.5 | 9 | 11 |
| Example 1 above | No | 0.488 | 2.06 | 1.95 | 1.56 | 1.48 | 385 | 10 | 9 | 5 | the example being slightly better. Control cake 2, with no chemical leavening and without the increased level of α-phase crystal-tending emulsifier taught by this invention, lacked almost an inch in center height cold and 0.62 inch edge height compared to the cake of this example. The grain grade is a subjective measurement of the coarseness or fineness of the cake texture. A grain value of from 7 to 10 is acceptable with 10 being an essentially perfect cake in terms of texture. Control cake 1 has an acceptable grade of 8 while the cake of this example excells with a grade of 10. Control cake 2 has an acceptable grain grade, however, its lack of height makes it totally unacceptable. The hole and tunnel rating is a subjective measurement of the number and size of the larger and irregular holes and tunnels found in a baked cake. A rating of from 7 to 10 is acceptable with 10 being an essentially perfect cake, lacking any irregular holes and tunnels. The control cakes and the cake of this example all had a rating of 9 for holes and tunnels.

Finally, the true test of any cake is in the tasting. Here, the cake of this example excelled. It had a delectable, moist taste that was much superior to both control cakes. There was absolutely no bitterness due to unreacted leavening ingredients, while control cake 1 had a very slight amount of bitterness and control cake 2, although without bitterness, was totally unacceptable from the standpoint of height and volume.

less than three minutes, and baking for about 30 minutes at 360° F.

One layer of cake produced as described above was compared with two control cake layers using essentially the same ingredients in the same amounts with the exception being the shortening and leavening ingredients. The shortening used in the control cakes at the same amount consisted essentially of 87% Pertex, a commercial shortening product made from hydrogenated vegetable oils, 10% lactic acid emulsifier and 3% rapeseed monoglyceride. In control cake 3 the mix of the example was changed to contain the following amount of chemical leaving ingredients, by weight percent: 0.85% baking soda, 0.58% sodium acid pyrophosphate, and 0.52% monocalcium phosphate, while in control cake 4 no leavening ingredients were added at all.

The control cakes were prepared and baked in the usual way, by mixing the dry ingredients with water and whole eggs. In order to make a fair comparison, control cake 3 was mixed for three minutes, according to the directions that accompany the mix; while control cake 4 was mixed eleven minutes, until the batter would no longer incorporate air and the maximum batter volume was obtained. All mixing was done with a standard household mixer. Exactly the same amount, by weight, of batter and the same size pan was used for each test layer. Table II compares the control cakes

TABLE II

| Cake layer | $CO_2$ producing leavening present | Batter density (gm./cc.) | Cake height center (inches) | | Cake height edge (inches) | | Weight of depanned cake (grams) | Grain grade | Hole and tunnel rating | Total mixing time (minutes) |
|---|---|---|---|---|---|---|---|---|---|---|
| | | | Hot | Cold | Hot | Cold | | | | |
| Control cake 3 | Yes | 0.676 | 2.04 | 1.93 | 1.55 | 1.48 | 394 | 8 | 8 | 3 |
| Control cake 4 | No | 0.79 | 1.66 | 1.06 | 1.06 | 0.90 | 396 | 9.5 | 9 | 11 |
| Example 2 above | No | 0.503 | 2.24 | 1.78 | 1.92 | 1.78 | 381 | 9.25 | 9.5 | 5 |

EXAMPLE II

A cake mix for producing yellow cake was prepared utilizing the following formula:

Ingredient:
- Sugar (powdered sucrose) _____ percent__ 42.23
- Flour (soft white wheat) _____ do____ 41.32
- Shortening * _____ do____ 11.22
- Dextrose _____ do____ 2.05
- Non-fat dry milk solids _____ do____ 2.05
- Salt _____ do____ 0.76
- Yellow flavor _____ do____ 0.16
- Bean gum _____ do____ 0.21
- Yellow dye _____ p.p.m.__ 677
- Red dye _____ p.p.m.__ 86

* The shortening was essentially 13% propylene glycol monopalmitate, 11% propylene glycol mono esters of palm oil, 3% propylene glycol mono esters of Crambe oil, and 73% lard.

The cake mix was prepared by thoroughly mixing the sugar, flour and shortening and then milling by passing through a 3-roll mill, the first and second rolls having speed ratios of 3:1, and the second and third rolls having ratios of 2:1. Two passes through the mill were made. After milling, the other ingredients were added and thoroughly blended in and the mixture finally passed through an impact grinder.

Cakes of superior volume, fine grain structure, and tender eating quality were made from this mix by adding two whole eggs, and about one and a quarter cups of water to 20 oz. of the mix, beating slowly with a standard home mixer until the ingredients were moist, at a medium speed for two minutes, then at the highest speed for not with the cake of this example.

As can be seen in Table II, the cakes were measured in a manner similar to those of Example 1. The physical measurements of the layers showed that both control cake 3 and the cake of this example were within a few tenths of an inch of each other. When the cold height of the center and the edge of each layer was added the total for the cake of this example was 0.15 inch greater than that of control cake 3 and 1.60 inches greater than that of control cake 4. The grain grade, a subjective measurement of coarseness or fineness of the cake texture, was over a full point higher for the cake of this invention in comparison to control cake 3. Although control cake 4 had a better grain grade, by a fraction of a point, its poor height and density made it unacceptable. The hole and tunnel rating is a subjective measurement of the number and size of the larger and irregular holes and tunnels found in a baked cake. The cake of this example was clearly better, by 1.5 points, than control cake 3, while control cake 4 was within 0.5 points of the cake of this example, it was unacceptable due to its poor height and density measurements.

The taste of the cake of this example excelled. It had a delectable, moist, rich taste that was much superior to both control cakes. There was absolutely no bitterness due to unreacted leavening ingredients, while control cake 3 had a very slight amount of bitterneess due in part to unreacted leavening ingredients, although control cake 4 lacked bitterness, it had a dry taste.

We claim:
1. A dry prepared culinary mix for the preparation of layer cakes, which comprises by weight:
 (A) 40–55% flour
 (B) 30–60% sugar
 (C) 8–15% shortening, which contains 23% to 35% by weight of the shortening of an α-phase crystal-tending emulsifier;
said mix being substantially free from leavening ingredients which release $CO_2$ gas before or during the baking process.

2. The composition of claim 1 wherein the shortening is a plastic shortening and the α-phase crystal-tending emulsifier is selected from the group consisting of propylene glycol monostearate, propylene glycol monopalmitate, propylene glycol mono-palm oil, propylene glycol mono esters of Crambe oil, acetylated mono- and di-glycerides, and lactylated mono- and di-glycerides.

3. The composition of claim 2 wherein the α-phase crystal-tending emulsifier is selected from the group consisting of propylene glycol monopalmitate, propylene glycol mono-palm oil and propylene glycol mono esters of Crambe oil.

4. The composition of claim 3 wherein the shortening consists essentially of 70% to 76% plastic shortening, 10% to 14% propylene glycol monopalmitate, 9% to 13% propylene glycol mono-palm oil and 2% to 5% propylene glycol mono esters of Crambe oil.

5. The composition of claim 4 wherein the shortening is lard.

References Cited
UNITED STATES PATENTS
3,428,461  2/1969  Hatton et al. _____ 99—9 X RAYMOND N. JONES, Primary Examiner U.S. Cl. X.R.
99—118 R, 123